United States Patent [19]

Fujiwara et al.

[11] Patent Number: 5,002,608

[45] Date of Patent: Mar. 26, 1991

[54] TITANIUM DIOXIDE COATED MICACEOUS IRON OXIDE PIGMENTS AND METHOD FOR PRODUCING THE SAME

[75] Inventors: Sanji Fujiwara; Nobumoto Hiraoka; Mitsuo Harada; Hiroshi Shitamichi, all of Okayama, Japan

[73] Assignee: Tayca Corporation, Osaka, Japan

[21] Appl. No.: 488,463

[22] Filed: Feb. 26, 1990

Related U.S. Application Data

[63] Continuation of Ser. No. 166,499, Mar. 10, 1988, abandoned.

[30] Foreign Application Priority Data

Mar. 11, 1987 [JP] Japan ................................ 62-056193
Mar. 18, 1987 [JP] Japan ................................ 62-065173
Sep. 18, 1987 [JP] Japan ................................ 62-235836

[51] Int. Cl.$^5$ .............................................. C09C 1/36
[52] U.S. Cl. .................................... 106/437; 106/441; 106/415; 106/439
[58] Field of Search ............... 106/436, 437, 441, 415, 106/439, 459; 428/363

[56] References Cited

U.S. PATENT DOCUMENTS

| | | | |
|---|---|---|---|
| 3,022,186 | 2/1962 | Hund | 106/300 |
| 3,869,398 | 3/1975 | Suzuki et al. | 106/304 |
| 3,956,007 | 5/1976 | Modly | 106/300 |
| 4,552,593 | 11/1985 | Ostertag | 106/439 |
| 4,744,832 | 5/1988 | Franz et al. | 106/439 |

Primary Examiner—Mark L. Bell
Assistant Examiner—Chris Gallo
Attorney, Agent, or Firm—Burns, Doane, Swecker & Mathis

[57] ABSTRACT

The weatherability and lightfastness of TiO$_2$ coated micaceous iron oxide (MIO) pigment may be improved by transforming the TiO$_2$ present in the coating layer to rutile TiO$_2$. Further improvement in the weatherability and lightfastness may be achieved by coating the pigment with an oxide of Cr, V, Mo, Al or a mixture thereof and/or a hydrous oxide of Cr or V, or a combination of two or more hydrous oxides of Cr, V, Al and Si.

5 Claims, No Drawings 5,002,608

TITANIUM DIOXIDE COATED MICACEOUS IRON OXIDE PIGMENTS AND METHOD FOR PRODUCING THE SAME

This application is a continuation of application Ser. No. 07/166,499, filed Mar. 10, 1988.

BACKGROUND OF THE INVENTION

This invention relates to titanium dioxide coated micaceous iron oxide pigments having improved weatherability and lightfastness. It also relates to the production of such pigments.

Japanese Patent Publication No. 7176/1976 assigned to the assignee of this application discloses a pigment composed of flaky micaceous iron oxide (MIO) having a thin coating layer of a metal oxide such as titanium dioxide. This coating layer is transparent and has a high refractive index so that the pigment exhibits a unique metallic glamor owing to the interference of light. It has been found, however, that the above pigment tends to lose its unique glamor upon exposing to light for a long period of time particularly under outdoor conditions. This is because the $TiO_2$ crystals forming the coating layer are of anatase type. Attempts have been made to produce a similar pigment coated with rutile type $TiO_2$ which is known to have a greater weatherability than antatase type $TiO_2$. Unfortunately, since the transition of $TiO_2$ to rutile requires a higher temperature and/or a longer period of time than the transition to anatase, the above attempts failed to produce a pigment having the same or similar optical properties as the prior art pigment. This is because th MIO substrate is not stable and/or reacts with $TiO_2$ under such conditions.

SUMMARY OF THE INVENTION

It is, therefore, an object of the present invention to provide an MIO pigment having a coating of rutile $TiO_2$ with improved weatherability while retaining a unique light interference glamor. Other objects and advantages of the invention will become apparent as the description proceeds. In one aspect of the present invention, there is provided a pigment composed of flaky MIO having a thin coating of $TiO_2$, the improvement wherein said $TiO_2$ is rutile $TiO_2$.

According to another aspect of the present invention, there is provided a method for producing a $TiO_2$ coated MIO pigment comprising adding a water-soluble titanium compound to an aqueous suspension of flaky MIO particles, hydrolyzing said titanium compound and depositing the resulting hydrous titanium dioxide on the surfaces of the MIO particles recovering and calcinating the resulting coated MIO particles, the improvement wherein a water-soluble salt of Zn, Sn, Sb, Li or a mixture of said salts to said suspension prior to said calcination step whereby a major proportion of said $TiO_2$ in the coating layer is transformed to the rutile type.

In a further aspect, the present invention provides a $TiO_2$ coated MIO pigment having thereon a protective coating of an anhydrous oxide of Cr, V, Mo, Al or mixtures of said oxides.

In place of or in addition to said protective coating, the $TiO_2$ coated MIO pigment may be coated with a hydrous oxide of Cr or V, or a combination of two or more hydrous oxides of Cr, V, Al and Si. These coatings in conjunction with the coating with rutile $TiO_2$ may greatly enhance the weatherability and light-fastness of the $TiO_2$ coated MIO pigments.

DETAILED DESCRIPTION OF THE INVENTION

The process for producing an MIO pigment having a coating of rutile type $TiO_2$ according to the present invention may be the same as one disclosed in the above-cited Japanese Patent Publication No. 7176/1976 except that a metal salt capable of promoting the transformation of $TiO_2$ to rutile type is added to an aqueous suspension of MIO prior to the calcination step of $TiO_2$ coated MIO particles.

The starting MIO particles may be of naturally occurring or synthetic. They are flaky in shape and preferably have an average diameter of 2 to 200 microns and an average thickness of 0.3 to 5 microns.

In a first embodiment of the invention, the MIO particles are suspended in water to make a slurry and a solution of a water-soluble titanium compound is added with stirring. In order to hydrolyze the titanium compound to hydrous $TiO_2$, the slurry is gradually heated to a temperature between 80° C. and the boiling point. Alternatively, the slurry is gradually neutralized by adding a base portionwise with stirring. The resulting hydrous $TiO_2$ particles will deposit on the surfaces of MIO particles. Usable titanium compounds include titanyl sulfate, titanium tetrachloride and a mixture thereof. Titanium tetrachloride is preferable.

The rutile-transforming promoter may be added to the aqueous slurry of MIO prior to, simultaneously with or subsequent to the addition of the solution of said titaninium compound. Alternatively, the promoter may be added to an aqueous slurry of coated MIO which has been recovered, washed and resuspended in water prior to the calcination step, and then hydrolyzed into its hydrous oxide form.

Usable promoters include water-soluble salts of Zn, Sn, Sb or Li such as chlorides, nitrates, sulfates and mixtures of these salts. Zn and Sn salts are preferred.

Preferably the aqueous slurry is constantly stirred during the coating operation. After the coating operation, the slurry is filtered and the resulting cake is washed, dried and calcined at a temperature from 500° C. to 1200° C., preferably from 600° C. to 900° C. By following the above procedure with the use of a promoter, it is possible to transform a major proportion of $TiO_2$ present in the coating layer into the rutile type without impairing the light interference effect of the resulting pigment. Thus the product has an improved weatherability compared with the prior art pigment having an anatase type $TiO_2$ coating.

The amount of $TiO_2$ coating preferably ranges from 0.1 to 30% by weight of MIO and the amount of the rutile transforming promoter may be less than 50% calculated as metal oxide by weight of $TiO_2$.

In a second embodiment of the invention, the procedures of the first embodiment are followed up to the recovery step of hydrous $TiO_2$ coated MIO particles as a wet cake.

Then the wet cake is resuspended in water to make an aqueous slurry and a solution of a water-soluble salt of Cr, V, Mo or Al such as chloride, nitrate or sulfate, or a mixture of these salts is added. The slurry is then gradually heated to a temperature between 80° C. and the boiling point or gradually neutralized with the addition of a base portionwise to hydrolyze the water-soluble metal salt to the corresponding hydrous metal oxide. Preferbly the slurry is constantly stirred during this operation. The resulting hydrous metal oxide will deposit on the previously formed hydrous $TiO_2$ coating layer. The resulting coated MIO particles are recovered by filtration, washed with water, dried and calcined at a temperature ranging from 500° C. to 1000° C. preferably from 600° C. to 900° C. The finished pigment thus produced has, in addition to the light interfering rutile $TiO_2$ layer, a protective layer of a metal oxide which gives an added improvement in weatherability to the finished pigment.

Among metal species tested for this purpose including Cr, V, Al, Mn, Mo, Zr, Fe, Co, Cu, rare earth metals and their combinations Cr, V, Mo and Al have been proven satisfactory when using alone or in combination. When a plurality of oxides of these metals are to be coated, they may be deposited on the substrate particles either simultaneously or successively.

The amount of this protective coating prior to the calcination step preferably ranges between 0.001 and 1.0% calculated as metal oxide by weight of the $TiO_2$ coated MIO substrate.

In a further embodiment of the invention, a secondary protective coating layer may be provided in place of or in addition to the primary protective coating on the $TiO_2$ coated MIO pigment.

This may be performed by adding a solution of a water-soluble salt of a metal species to be coated to an aqueous slurry of a substrate MIO pigment having a light interfering $TiO_2$ coating layer, hydrolyzing the metal salt and depositing the resulting hydrous metal oxide, recovering the coated particles, washing and drying in the sam manner as the previous embodiments except for omitting the calcination step. This post coating also has an effect of added improvement in weatherability of the finished pigment.

Among metal species tested for this purpose including Cr, V, Al, Si, Zr, Ti, Sn, Zn, Fe, Mn, Co, Mo, Cu and rare earth metals, Cr or V alone or combinations of two or more metals of Si, Al, Cr and V have been proven satisfactory. When a plurality of hydrous hydroxides of these metals are to be coated, they may be deposited either simultaneously or successively. Particularly advantageous effects may be obtained by coating first with dense silica and then with another hydrous metal oxide.

The amount of this post-coating preferably ranges between 0.1 and 10% calculated as hydrous metal oxide by weight of the $TiO_2$ coated MIO substrate.

It will be understood that the above-described coatings may be applied to advantage to $TiO_2$ coated MIO pigment wherein $TiO_2$ is of anatage type.

The invention is further illustrated by the following examples in which all percents are by weight unless otherwise indicated.

EXAMPLE 1

To a suspension of 200 g of MIO in 1.4 liter of water were added with stirring 146 g of an aqueous solution of titanium tetrachloride (containing 27.4% of $TiO_2$ and 32.3% of HCl) and 14 g of $SnCl_4.5H_2O$. The mixture was heated gradually at a rate of 1° C./minute to 98° C. and maintained at the same temperature for 3 hours with stirring. Then the suspension was filtered and the resulting cake was washed, dried and calcined at 700° C. for 1 hour to give $TiO_2$ coated MIO pigment. X-ray diffraction analysis revealed that the $TiO_2$ coating layer consisted of rutile $TiO_2$.

EXAMPLE 2

To a suspension of 200 g of MIO in 1.4 liter of water was added with stirring 146 g of anaqueous solution of titanium tetrachloride (containing 27.4% of $TiO_2$ and 32.3% of HCl). The mixture was heated gradually at a rate of 1° C./minutes to 95° C. and maintained at the same temperature for 3 hours. The suspension was filtered and the resulting cake was washed and resuspended in 1 liter of water. After 15 g of $ZnCl_2$ dissolved in a small amount of water was added, the suspension was neutralized gradually to pH 6.5 with aqueous ammonia, stirred for 30 minutes and then filtered. The resulting cake was washed, dried and calcined at 730° C. for 1 hour to give $TiO_2$ coated MIO pigment. X-ray diffraction analysis revealed that the $TiO_2$ coating layer consisted of rutile $TiO_2$.

EXAMPLE 3

To a suspension of 200 g of MIO in 1.4 liter of water were added with stirring 146 g of an aqueous solution of titanium tetrachloride (containing 27.4% of $TiO_2$ and 32.3% of HCl) and 14 g of $SnCl_4.5H_2O$. The mixture was heated gradually at a rate of 1° C./minutes to 98° C. and stirred for 3 hours at the same temperature. The suspension was filtered and the resulting cake was washed to obtain wet cake of hydrous $TiO_2$ coated MIO.

This cake was resuspended in 1 liter of water and heated to 50° C. To this were added 8 ml of an aqueous solution of aluminum sulfate having a concentration of 50 g/liter as $Al_2O_3$ and an amount of aqueous solution of NaOH having a concentration of 5 g/liter over 60 minutes while maintaining the pH of the suspension at 5-7. The suspension was neutralized to pH 7.0, stirred for 30 minutes and filtered. The resulting cake was washed, dried and calcined t 800° C. for 1 hour to obtain $TiO_2$ coated MIO pigment.

EXAMPLE 4

To the aqueous suspension of hydrous $TiO_2$ coated MIO prepared in Example 3 was added a solution of 0.075 g of $(NH_4)_6Mo_7O_{24}.4H_2O$ in 50 ml of water. The mixture was neutralized with a 5 g/liter solution of NaOH to pH 7.0 over 30 minutes. Then 8 ml of an aqueous solution of aluminum sulfate (50 g/liter as $Al_2O_3$) and an amount of the above NaOH solution were added over 60 minutes while maintaining the pH of the suspension at 5-7. The suspension was neutralized to pH 7.0, stirred for 30 minuted and filtered. The resulting cake was washed, dried and calcined at 800° C. for 1 hour to obtain $TiO_2$ coated MIO pigment.

EXAMPLE 5

Example 4 was followed except that 0.075 g of $(NH_4)_6Mo_7O_{24}$ was replaced by 0.21 g of $CrCl_3.6H_2O$.

EXAMPLE 6

Example 4 was followed except that 0.075 g of $(NH_4)_6Mo_7O_{24}$ was replaced by 0.077 g of $NH_4VO_3$.

EXAMPLE 7

100 g of $TiO_2$ coated MIO obtained in Example 1 was suspended in 600 ml of water and heated to 50° C. To this was added 3.5 g of $CrCl_3.6H_2O$ in 100 ml of water.

The mixture was neutralized with a 5 g/liter solution of NaOH to pH 7.0 over 30 minutes. Then 40 ml of an aqueous solution of alminum sulfate (50 g/liter as Al$_2$O$_3$) was added. The mixture was neutralized with the above NaOH solution to pH 7.0 over 30 minutes, stirred for additional 30 minutes and filtered. The resulting cake was washed and dried at 120° C. for 8 hours to obtain TiO$_2$ coated MIO pigment.

EXAMPLE 8

Example 7 was followed except that 3.5 g of CrCl$_3$.6H$_2$O was replaced by 1.3 g of NH$_4$VO$_3$.

EXAMPLE 9

100 g of TiO$_2$ coated MIO obtained in Example 1 was suspended in 600 ml of water. The suspension was heated to 90° C. and adjusted to pH 9, 0 with NaOH. To this were added 100 ml of an aqueous solution of sodium silicate (containing 20 g/liter of SiO$_2$ and 6 g/liter of Na$_2$O) and an amount of dilute sulfuric acid sufficient to maintain pH 9.0 over 180 minutes. After the addition of sodium silicate solution, the mixture was neutralized to pH 7.0 with dilute sulfuric acid and allowed to stand for 10 minutes. Then 40 ml of an aqueous solution of aluminum sulfate (50 g/liter as Al$_2$O$_3$) was added. The mixture was neutralized to pH 7.0 with a 5 g/liter solution of NaOH over 30 minutes, stirred for additional 30 minutes and filtered. The resulting cake was washed and then dried at 120° C. for 8 hours to obtain TiO$_2$ coated MIO pigment.

EXAMPLE 10

Example 7 was followed starting from TiO$_2$ coated MIO obtained in Example 3.

EXAMPLE 11

Example 7 was followed starting from TiO$_2$ coated MIO obtained in Example 4.

EXAMPLE 12

Example 7 was followed starting from TiO$_2$ coated MIO obtained in Example 5.

EXAMPLE 13

Example 7 was followed starting from TiO$_2$ coated MIO obtained in Example 6.

COMPARATIVE EXAMPLE

To a suspension of 200 g of MIO in 1.4 liter of water was added 200 ml of a solution of titanyl sulfate (200 g/liter of TiO$_2$ and 340 g/liter of H$_2$SO$_4$). The slurry was gradually heated to 98° C. at a rate of 1° C./minutes with stirring, stirred for additional 3 hours t the same temperature and filtered. The resulting cake was washed, dried and calcined at 700° C. for 1 hour to obtain TiO$_2$ coated MIO pigment. X-ray diffraction analysis revealed that the coating layer consisted of anatase TiO$_2$.

WEATHERING TEST

TiO$_2$ coated MIO pigments prepared in the above examples were subjected to the following weathering test.

| Base Enamel | Parts by Weight |
| --- | --- |
| TiO$_2$ coated MIO | 20.0 |
| ACRYDIK 47-712[1] | 114.0 |
| SUPERBEKKAMIN L-117[2] | 40.0 |
| SOLVESSO 100 | 8.0 |
| Toluene | 24.0 |
| Ethyl acetate | 8.0 |
| Butyl acetate | 8.0 |
| 1% silicone | 0.4 |

Note
[1]Acrylic varnish sold by Dainippon Ink And Chemicals, Inc., 50% nonvolatile content.
[2]Melamine resin sold by the same company, 60% nonvolatile content.

The above formulation was dispersed in a disper at 1800 rpm for 5 minutes.

| Clear Coat | Parts by Weight |
| --- | --- |
| ACRYDIK 44-179[3] | 112.0 |
| SUPERBEKKAMIN L-117 | 46.0 |
| Toluene | 26.8 |
| Ethyl acetate | 12.6 |
| Butyl acetate | 8.4 |
| SOLVESSO 100 | 4.2 |

Note
[3]Acrylic varnish sold by Dainippon Ink And Chemicals, Inc., 50% nonvolatile content.

Test Panel

A carbon black enamel was applied on a bonderized mild steel plate and baked. The coated plate was polished with No. 500 polishing paper, washed with water and dried. Then the polished surface was sprayed with the above base enamel to a dry film thickness of 25 microns, set for 10 minutes, sprayed with the above clear coating composition, and set for 30 minutes. The coating film was finally baked at 140° C. for 25 minutes.

Weathering test was carried out by exposing the panel to light in Weather-O-Meter.

Lightfastness

Lightfastness with time was evaluated visually in terms of the total score made by five panelers according to the following schedule.

1: No fading
2: Slight fading
3: Fading

The results obtained are shown in Table 1.

TABLE 1

| Example | TiO$_2$ | Protective Coating Before Firing | Protective Coating After Firing | Total Score 500 | 1000 | 2000 | 3000 hrs. |
| --- | --- | --- | --- | --- | --- | --- | --- |
| 1 | Rutile | — | — | 5 | 8 | 15 | 15 |
| 2 | " | — | — | 5 | 10 | 12 | 15 |
| 3 | " | Al$_2$O$_3$ | — | 5 | 5 | 10 | 14 |
| 4 | " | MoO$_3$ + Al$_2$O$_3$ | — | 5 | 5 | 9 | 13 |
| 5 | " | Cr$_2$O$_3$ + Al$_2$O$_3$ | — | 5 | 5 | 9 | 13 |
| 6 | " | V$_2$O$_3$ + Al$_2$O$_3$ | — | 5 | 5 | 9 | 13 |
| 7 | " | — | Cr$_2$O$_3$ + Al$_2$O$_3$ | 5 | 5 | 7 | 12 |
| 8 | " | — | V$_2$O$_5$ + Al$_2$O$_3$ | 5 | 5 | 8 | 13 |
| 9 | " | — | SiO$_2$ + Al$_2$O$_3$ | 5 | 5 | 8 | 12 |
| 10 | " | Al$_2$O$_3$ | Cr$_2$O$_3$ + Al$_2$O$_3$ | 5 | 5 | 5 | 9 |

TABLE 1-continued

| Example | TiO$_2$ | Protective Coating Before Firing | Protective Coating After Firing | Total Score 500 | 1000 | 2000 | 3000 hrs. |
|---|---|---|---|---|---|---|---|
| 11 | " | MoO$_3$ + Al$_2$O$_3$ | Cr$_2$O$_3$ + Al$_2$O$_3$ | 5 | 5 | 5 | 7 |
| 12 | " | Cr$_2$O$_3$ + Al$_2$O$_3$ | Cr$_2$O$_3$ + Al$_2$O$_3$ | 5 | 5 | 5 | 7 |
| 13 | " | V$_2$O$_5$ + Al$_2$O$_3$ | Cr$_2$O$_3$ + Al$_2$O$_3$ | 5 | 5 | 5 | 7 |
| Comp. | Anatase | — | — | 12 | 15 | 15 | 15 |

Crosscut Tape Test

The coated film was crosscut into 100 square sections of 1×1 mm. A cellophan adhesive tape was applied on the cut surface and peeled off rapidly. The number of remaining sections was counted. The results are shown in Table 2.

TABLE 2

| Example | Time, hrs. Initial | 1000 | 2000 | 3000 |
|---|---|---|---|---|
| 1 | 100 | 90 | 50 | 0 |
| 3 | 100 | 100 | 80 | 40 |
| 4 | 100 | 100 | 90 | 45 |
| 5 | 100 | 100 | 85 | 45 |
| 6 | 100 | 100 | 85 | 45 |
| 7 | 100 | 100 | 97 | 50 |
| 8 | 100 | 100 | 92 | 47 |
| 9 | 100 | 100 | 92 | 45 |
| 10 | 100 | 100 | 100 | 90 |
| 11 | 100 | 100 | 100 | 98 |
| 12 | 100 | 100 | 100 | 98 |
| 13 | 100 | 100 | 100 | 98 |
| Comparative | 100 | 72 | 5 | 0 |

EXAMPLE 14

The wet cake of hydrous TiO$_2$ coated MIO prepared in Comparative Example was resuspended in 1 liter of water and heated to 50° C. To this suspension was added a solution of 3.5 g of CrCl$_3$.6H$_2$O in 100 ml of water. The mixture was neutralized with a 5 g/liter solution of NaOH to pH 7.0 over 30 minutes. Then 8 ml of an aqueous solution of aluminum sulfate having a concentration of 50 g/liter as Al$_2$O$_3$ was added over 60 minutes while maintaining the pH of the mixture at 5-7. The mixture was adjusted at pH 7.0 stirred for additional 30 minutes and filtered. The resulting cake was washed, dried and calcined at 700° C. for 1 hour to give TiO$_2$ coated MIO pigment.

EXAMPLE 15

100 g of TiO$_2$ coated pigment produced in Example 14 was suspended in 600 ml of water and heated to 50° C. To this was added 3.5 g of CrCl$_3$.6H$_2$O in 100 ml of water. The mixture was neutralized to pH 7.0 with a 5g/liter solution of NaOH over 30 minutes. Then 40 ml of an aqueous solution of aluminum sulfate (50 g/liter concentraion as Al$_2$O$_3$) was added. The mixture was neutralized with the above NaOH solution to pH 7.0 over 30 minutes, stirred for additional 30 minutes and filtered. The resulting cake was washed and dried at 120° C. for 8 hours to give TiO$_2$ coated MIO pigment.

Weathering Test

The products of Examples 14 and 15 were tested for their weatherability in the same manner as described hereinbefore. The results are shown in Tables 3 and 4 below.

TABLE 3

| Example | Fading Score Time (hrs) 500 | 1000 | 2000 | 3000 |
|---|---|---|---|---|
| 14 | 7 | 12 | 15 | 15 |
| 15 | 5 | 7 | 10 | 12 |

TABLE 4

| Example | Crosscut (Remaining Number per 100 sections) Time (hrs) Initial | 1000 | 2000 | 3000 |
|---|---|---|---|---|
| 14 | 100 | 86 | 15 | 0 |
| 15 | 100 | 95 | 75 | 50 |

We claim:

1. A pigment produced by a process comprising:
forming an aqueous suspension of flaky micaceous iron oxide particles;
adding a water-soluble titanium compound to the suspension;
hydrolyzing the titanium compound to form hydrous TiO$_2$;
coating the hydrous TiO$_2$ onto the surfaces of the iron oxide particles; and
calcining the coated iron oxide particles;
wherein prior to the calcining step, one or more watersoluble salts of Zn, Sn, Sb or Li are added to the suspension and wherein the calcining step is effected at a temperature between 600° C. and 900° C. and for a period of time such that the iron oxide particles remain stable and the hydrous TiO$_2$ is converted to rutile TiO$_2$ without substantial reaction with the iron oxide particles.

2. A pigment comprising:
flaky, stable micaceous iron oxide particles;
a coating of rutile TiO$_2$ over each of said particles; and
at least one oxide of Zn, Sn, Sb or Li;
wherein the rutile TiO$_2$ is substantially unreacted with the iron oxide particles.

3. The pigment according to claim 1, wherein said micaceous iron oxide particles have an average diameter from 2 to 200 microns and an average thickness from 0.3 to 5 microns.

4. The pigment according to claim 1, wherein the amount of said TiO$_2$ is 0.1 to 30% by weight of said micaceous iron oxide.

5. The pigment according to claim 1, wherein the amount of said water-soluble salt of Zn, Sn, Sb, Li or a mixture of these salts is less than 50% calculated as metal oxide by weight of TiO$_2$.

* * * * *